(12) United States Patent
Dhong et al.

(10) Patent No.: US 6,226,731 B1
(45) Date of Patent: May 1, 2001

(54) METHOD AND SYSTEM FOR ACCESSING A CACHE MEMORY WITHIN A DATA-PROCESSING SYSTEM UTILIZING A PRE-CALCULATED COMPARISON ARRAY

(75) Inventors: Sang Hoo Dhong, Austin, TX (US); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/149,229

(22) Filed: Sep. 8, 1998

(51) Int. Cl.[7] .................................................. G06F 12/00
(52) U.S. Cl. ........................... 711/203; 711/205; 711/206
(58) Field of Search ................................... 711/205, 207, 711/202, 204, 203, 118

(56) References Cited

U.S. PATENT DOCUMENTS

| | | | |
|---|---|---|---|
| 5,386,527 | * | 1/1995 | Bosshart .................................... 711/3 |
| 5,497,469 | * | 3/1996 | Sakata et al. ........................ 711/203 |
| 5,517,633 | * | 5/1996 | Ohta et al. ............................ 711/146 |
| 6,047,354 | * | 4/2000 | Yoshioka et al. .................... 711/118 |

* cited by examiner

Primary Examiner—Tuan V. Thai
Assistant Examiner—Jan S. Williams
(74) Attorney, Agent, or Firm—Casimer K. Salys; Bracewell & Patterson, L.L.P.

(57) ABSTRACT

A cache memory within a data processing system. The cache memory includes a number of cache lines over which data may be transferred. The cache memory also includes a translation lookaside buffer for associating real addresses with virtual addresses. Virtual segment identifiers are stored within the translation lookaside buffer. In addition, the cache memory includes a comparison array for cross referencing virtual segment identifiers with effective addresses. The comparison array includes spaces populated with indications of whether or not a particular virtual segment identifier maintained within the translation lookaside buffer corresponds to a particular effective address. The comparison array allows a comparison to be performed in advance between effective addresses within the cache memory and all possible virtual segment identifiers maintained in the translation lookaside buffer prior to any conversion of virtual addresses to real addresses. In addition, each virtual segment identifier is composed of a portion of a virtual address.

14 Claims, 4 Drawing Sheets

ID AND SYSTEM FOR ACCESSING A
CACHE MEMORY WITHIN A DATA-
PROCESSING SYSTEM UTILIZING A PRE-
CALCULATED COMPARISON ARRAY

CROSS-REFERENCE TO RELATED APPLICATIONS

The present invention is related to co-pending, commonly-assigned U.S. patent application Ser. No. 09/062,002, IBM Docket No. AT9-97-555, entitled, "METHOD AND SYSTEM FOR ACCESSING A CACHE MEMORY WITHIN A DATA-PROCESSING SYSTEM", filed Jul. 8, 1998, the disclosure of which is incorporated herein by reference.

BACKGROUND OF THE INVENTION

1. Technical Field

The present invention relates to a method and system for data-processing in general, and in particular to a method and system for enhancing the speed of a memory access within a data-processing system. More particularly, the present invention relates to improved methods and systems for accessing a cache memory within a data-processing system. Still more particularly, the present invention relates to address translation in microprocessors. In addition, the present invention relates to the translation of virtual and real addresses for cache memory access.

2. Description of the Related Art

Microprocessors, usually implemented as a central processing unit (CPU) on a single integrated circuit chip within a data-processing system, lie at the heart of modern electronic and computer devices. As technology becomes increasingly complicated, the need arises for microprocessors that are faster and more efficient than previous microprocessor versions. One method of increasing the speed of such microprocessors is to decrease the amount of time necessary to access memory locations associated with such microprocessors.

A cache memory is one type of a memory location that may be associated with a typical microprocessor, either integral with the microprocessor chip itself or separate. The cache memory is also associated with a main memory located within the data-processing system. The cache memory is a special-purpose storage buffer, smaller and faster than main storage, utilized to hold a copy of instructions and data obtained from the main memory and likely to be needed next by the microprocessor. The cache memory typically functions as a storage buffer that contains frequently accessed instructions and data. The cache memory can be thought of as particular specialized high-speed memory in which frequently utilized data values are duplicated for quick access.

A typical cache memory, for example, stores the contents of frequently accessed random access memory (RAM) locations and the addresses where these data items are stored. When the microprocessor references an address in memory, the cache memory checks to see whether it holds that address. If the cache memory does hold the address, the data is returned to the microprocessor; if it does not, a regular memory access occurs.

A common technique for organizing the main memory within a data-processing system for memory access is to divide the main memory into blocks of contiguous locations called pages, each page having the same number of lines, each line having the same number of bytes. Accordingly, an address utilized to access the main memory typically includes a page number, a line number, and a byte location, and is commonly referred to as a real address (RA) or physical address. However, when a virtual addressing scheme is being utilized, the access address is then referred to as an effective address (EA) or virtual address. Given the fact that instructions or data are relocatable within the virtual addressing scheme, the effective address or virtual address must be mapped back to a corresponding real address or physical address that specifies an actual location within the main memory. Nevertheless, because the main memory is conceptually divided in pages, as mentioned previously, the low-order bits of an effective address that typically identify a byte within a page of the main memory usually do not require any translation, while only the high-order bits of the effective address are required to be translated to a corresponding real page address that specifies the actual page location within the main memory.

In order to increase the speed of access to data stored within the main memory, modern data-processing systems generally maintain the most recently used data in the cache memory. The cache memory has multiple cache lines, with several bytes per cache line for storing information in contiguous addresses within the main memory. Each cache line essentially comprises a boundary between blocks of storage that map to a specific area in the cache memory or high-speed buffer. In addition, each cache line has an associated "tag" that typically identifies a partial address of a corresponding page of the main memory. Because the information within cache may come from different pages of the main memory, the tag provides a convenient way to identify which page of the main memory a cache line belongs.

In a typical cache memory implementation, information is stored in one or several memory arrays. In addition, the corresponding tags for each cache line are stored in a structure known as a directory or tag array. Usually, an additional structure, called a translation lookaside buffer (TLB), is also utilized to facilitate the translation of a virtual address to a real address during a cache memory access. Cache memory access thus involves reading out a line of the cache and its associated tag. The real address from a translation array is then compared with the real address from the tag array. If these real addresses are identical, one realizes that the line in the cache that was read out is the desired line, based on the effective or virtual address calculated by the algorithm in use.

In order to access a byte in a cache memory with an effective or virtual address, the line portion (mid-order bits) of the effective or virtual address is utilized to select a cache line from the memory array, along with a corresponding tag from the directory or tag array. The byte portion (low-order bits) of the effective or virtual address is then utilized to choose the indicated byte from the selected cache line. At the same time, the page portion (high-order bits) of the effective address is translated via the segment register or segment lookaside buffer and TLB to determine a real page number. If the real page number obtained by this translation matches the real address tag stored within the directory, then the data read from the selected cache line is the data actually sought by the program. This is commonly referred to as a cache "hit," meaning that the requested data was found in the cache memory. If the real address tag and translated real page number do not agree, a cache "miss" occurs, meaning that the requested data was not stored in the cache memory. Accordingly, the requested data must be retrieved from the main memory or elsewhere within the memory hierarchy.

Both address translation and cache access involve comparison of a value read from one array with another value read from a different array. In the case of address translation, the virtual segment identifier associated with a given effective address and stored in a segment register or segment lookaside buffer is compared with the virtual address stored as part of an entry in the translation lookaside buffer. Similarly, the translated real page number is compared with the real page number read from the cache tag array to determine whether the accessed line in the cache is the required real page number.

With a direct-mapped cache, only one of the group of corresponding lines from all pages in a real memory page can be stored in the cache memory at a time; but in order to achieve a better "hit" ratio, sometimes a set-associative cache is utilized instead. For example, with an N-way set-associative cache, corresponding lines from N different pages may be stored. Since all entries can be distinguished by their associated tags, it is always possible to resolve which of the N lines having the same line number contains the information a program requested. The resolution requires comparison of the translated real page number to the N tags associated with a given line number. Each comparison generates an input to an N-to-1 multiplexor to select an appropriate cache line from among the N possibilities.

Regardless of the cache architecture being utilized, the critical path for address translation still includes a translation lookaside buffer, a directory or tag array, and a group of comparison circuits, which must be utilized during a cache access to select an appropriate cache line within the cache memory. Because this critical path can contribute certain unnecessary delays to the entire cache access process, it would be desirable to provide an improved method and system for address translation during a cache access within a data-processing system. Based on the foregoing, it can be appreciated that any improvement in cache access and address translation would lead to an overall improvement in microprocessor processing speed.

SUMMARY OF THE INVENTION

In view of the foregoing, it is therefore an object of the present invention to provide an improved method and system for data-processing.

It is another object of the present invention to provide an improved method and system for enhancing the speed of a memory access within a data-processing system.

It is yet another object of the present invention to provide an improved method and system for accessing a cache memory within a data-processing system.

It is still another object of the present invention to provide an improved method and system for the translation of effective and real addresses.

The above and other objects are achieved as is now described. In accordance with a preferred embodiment of the present invention, a cache memory within a data-processing system includes a number of cache lines over which data may be transferred. The cache memory also includes a translation lookaside buffer for associating real addresses with virtual addresses. Virtual segment identifiers are stored within the translation lookaside buffer. In addition, the cache memory includes a comparison array for cross referencing virtual segment identifiers with effective addresses. The comparison array includes spaces populated with indications of whether or not a particular virtual segment identifier maintained within the translation lookaside buffer corresponds to a particular effective address. The comparison array allows a comparison to be performed in advance between effective addresses within the cache memory and all possible virtual segment identifiers maintained in the translation lookaside buffer prior to any conversion of virtual addresses to real addresses. In addition, each virtual segment identifier is composed of a portion of a virtual address.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The present invention may be executed in a variety of processors having a cache memory. The cache memory may be, for example, a primary cache, a secondary or a tertiary cache.

Figure 1:
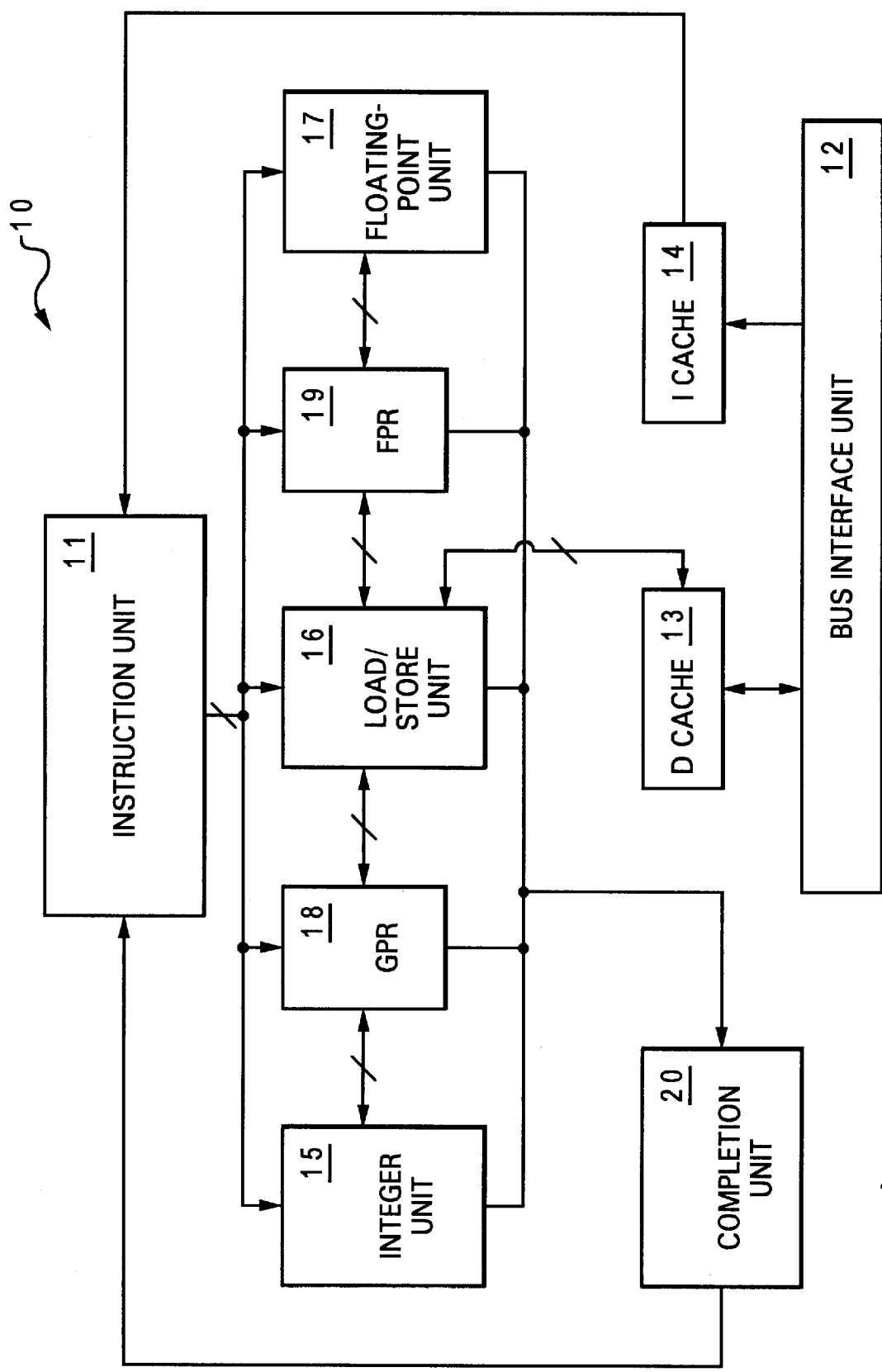
FIG. 1 is a block diagram of a processor in which a preferred embodiment of the present invention may be incorporated.

Referring now to the drawings and in particular to FIG. 1, there is depicted a block diagram of a processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a main memory (not shown). Instruction cache 14 is further coupled to an instruction unit 11 which fetches instructions from instruction cache 14 during each execution cycle.

Processor 10 also includes three execution units, namely, an integer unit 15, a load/store unit 16, and a floating-point unit 17. Each of execution units 15–17 can execute one or more classes of instructions and all execution units 15–17 can operate concurrently during each processor cycle. After execution has terminated, execution units 15–17 store data results to a respective rename buffer, depending upon the instruction type. Then, any one of execution units 15–17 signals a completion unit 20 that the instruction unit has finished. Finally, instructions are completed in program order by transferring result data from the respective rename buffer to a general purpose register 18 or a floating-point register 19.

Figure 2:
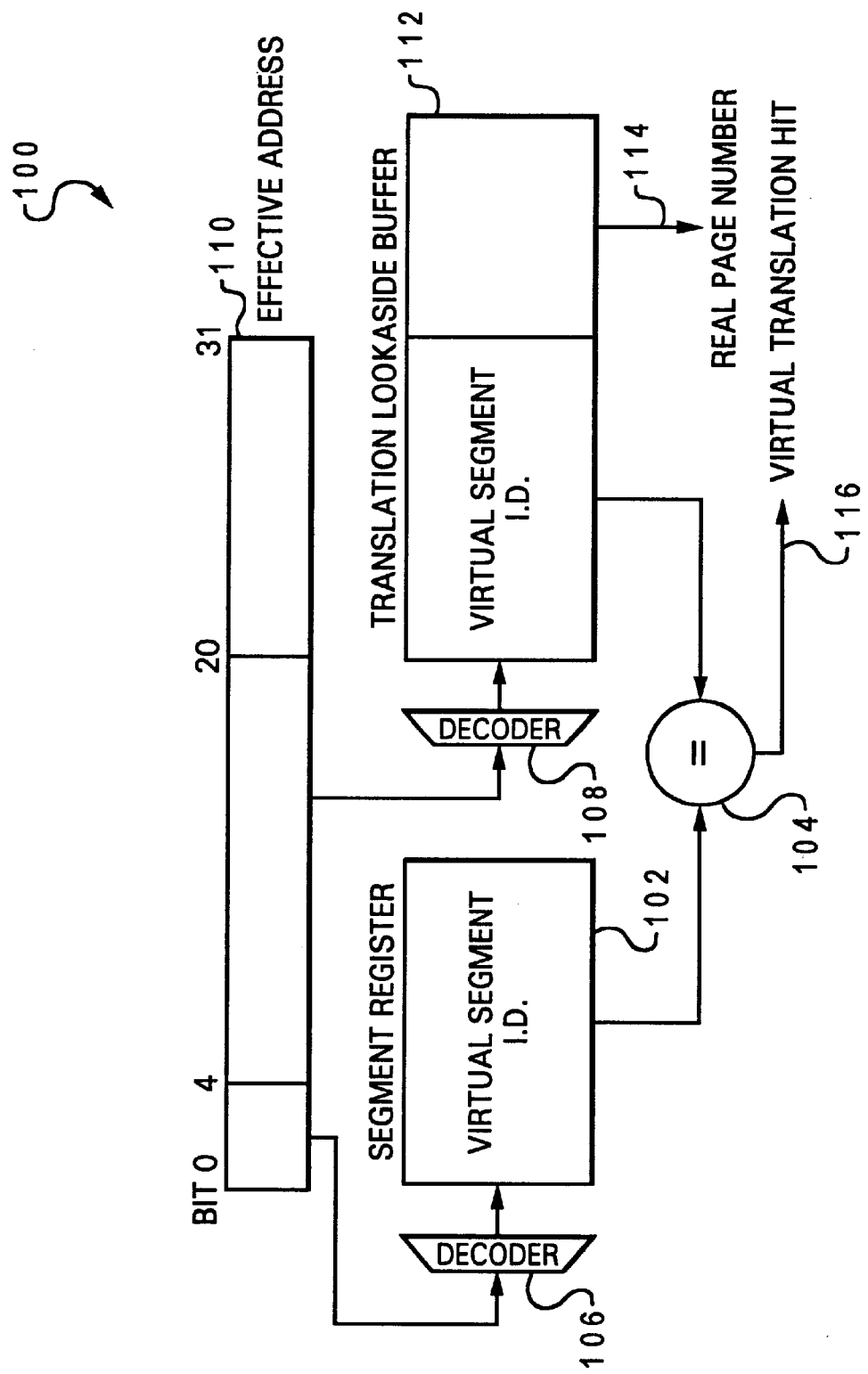
FIG. 2 illustrates a block diagram illustrative of a prior art address translation configuration.

FIG. 2 illustrates a block diagram illustrative of a prior art address translation configuration 100. In the case of address translation, for example, the virtual segment identifier (VSID) associated with a given effective address and stored in a segment register or segment lookaside buffer is compared with a virtual address stored as part of an entry in the translation lookaside buffer. If these match, the corresponding real page number read from the TLB represents the correct real page number required for this memory access. The translated real page number is then compared with the tag read from the cache directory to determine whether the accessed line in the cache is the required line.

This process is illustrated in configuration 100, which demonstrates the effective to virtual translation portion of the translation path for a microprocessor. An effective address 110 having 32 bits transfers data to decoders 106 and 108. Bits in the range of 0 to 3 are transferred to decoder 106. Bits in the range of 4 to 19 are transferred to decoder 108. Data from decoder 106 is transferred to segment register 102 which includes virtual segment identification data. Data from segment register 102 is then transferred to comparator 104. Comparator 104 is a circuit that compares two inputs and produces an output that is a function of the result of the comparison. Data from decoder 108 is transferred to translation lookaside buffer 112 which includes virtual segment identification data.

Real page number data is transferred to subsequent circuitry from translation lookaside buffer 112 via line 114. Output from translation lookaside buffer in the form of virtual segment identification data is also transferred to comparator 104. Data output of segment register 102 is then compared via comparator 104 to data output from translation lookaside buffer 112. Thus, in configuration 100, four bits of the 32-bit effective address select one of sixteen segment registers to obtain a virtual segment identifier (i.e., output from segment register 102). This value is then compared via comparator 104 to the same quantity read from translation lookaside buffer 112, which is accessed by other bits of effective address 110.

Figure 3:
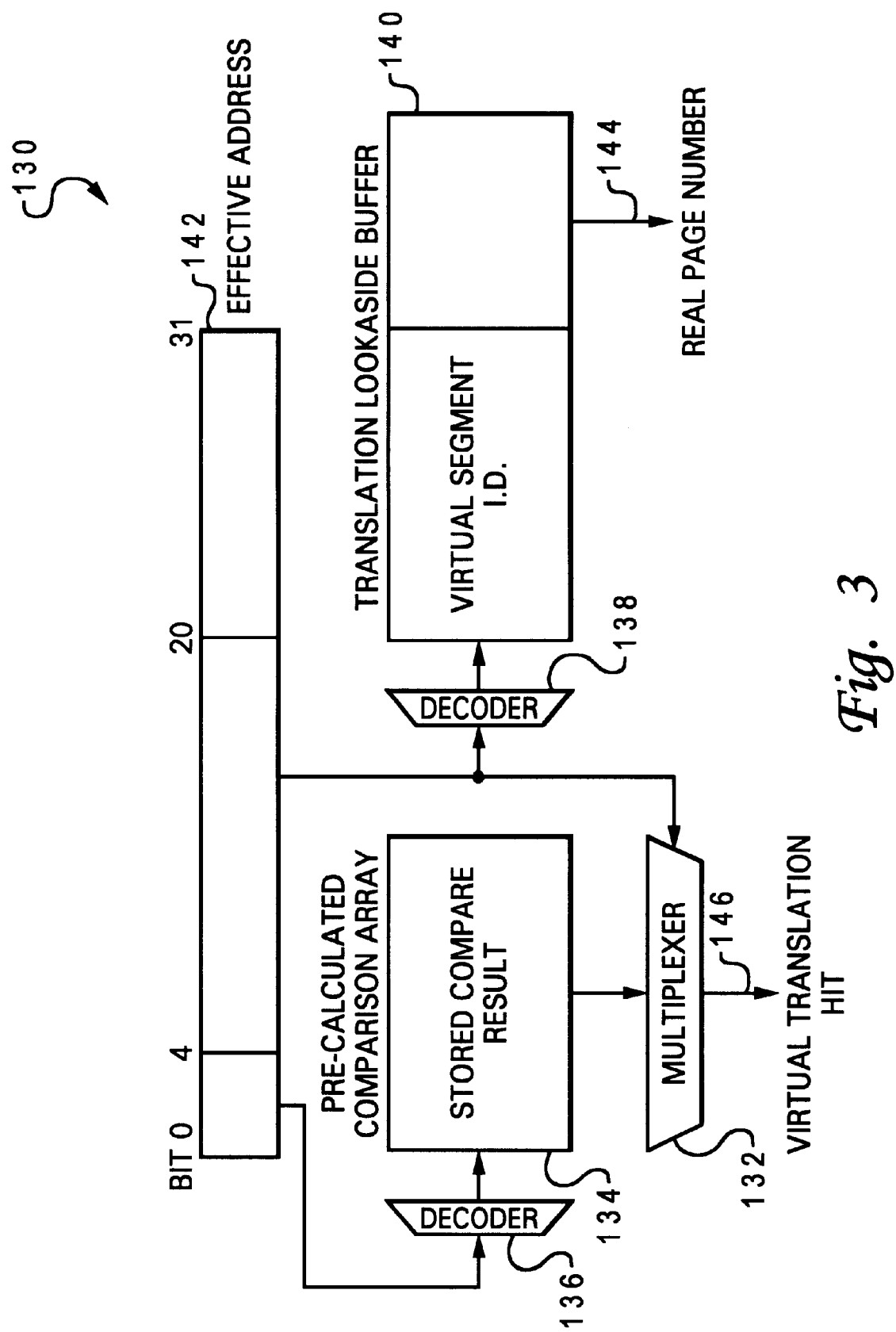
FIG. 3 depicts a block diagram illustrative of an address translation configuration, in accordance with a preferred embodiment of the present invention.
Figure 4:
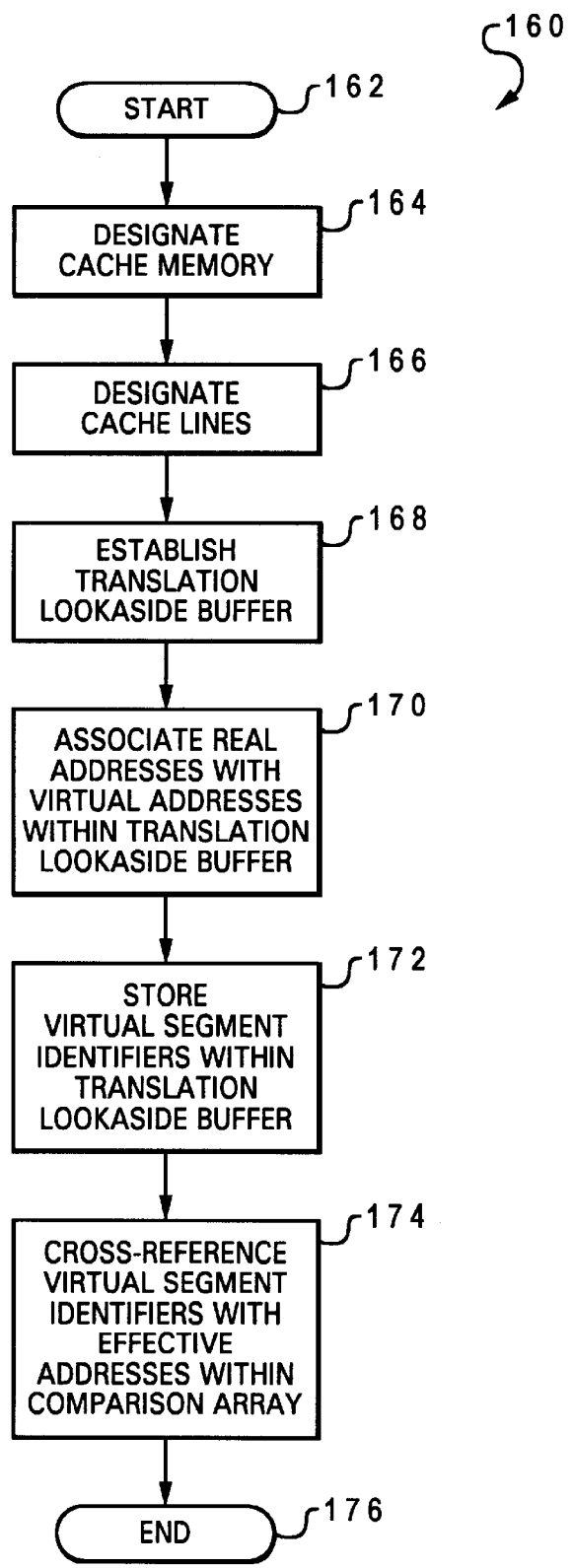
FIG. 4 illustrates a flow diagram that shows steps utilized to carry out the method and system of the present invention, in accordance with a preferred embodiment of the present invention.

FIG. 3 depicts a block diagram illustrative of an address translation configuration 130, in accordance with a preferred embodiment of the present invention. In address translation configuration 130, calculations are performed ahead of time, and the result is stored in a two dimensional array (i.e., two precalculated comparison array 134). Address translation configuration 130 includes a 32-bit effective address 142 whose first four bits are transferred to a decoder 136 whose output is fed to precalculated comparison array 134. Outputs corresponding to a row of precalculated comparison array 134 are fed to multiplexer 132. Multiplexer 132 also takes in data from effective address 142, which is used to select one bit from the multiplexer input and route it to the multiplexer output. Output 146 from multiplexer 132 indicates a virtual translation hit or miss. Effective address data is also transferred to decoder 138 whose output is coupled to translation lookaside buffer 140. Real page number data is fed from translation lookaside buffer 140 to associated circuitry (not shown) via line 144. In the example illustrated in FIG. 4, given an N-entry segment lookaside buffer and an M-entry translation lookaside buffer, an NxM array can be constructed. The entry stored in this array at location (a,b) will possess a "1" value if an entry in segment lookaside buffer "a" and an entry in translation lookaside buffer "b" have matching components. The two dimensional array is accessed in the x-dimension by the same mechanism that picks an entry from the N-entry segment lookaside buffer. The two dimensional array is accessed in the y-direction by the same mechanism that picks an entry from the M-entry translation lookaside buffer.

Set-associate organizations are readily supported by such a configuration. Additionally, the dimensions of such an array are independent of the length of the quantity whose comparison is represented by data in the array. In the case where the array represents the result of comparing the virtual segment identifier stored in the segment lookaside buffer or segment register with the result stored in the translation lookaside buffer, the array size is independent of the number of bits in the virtual segment identifier. One might find compression schemes that reduce the size of the NxM array. The virtual segment identifier (VSID) is included within translation lookaside buffer 140.

In the traditional process for cache access, translation from an effective to a real address is performed. Then a line is read out of the cache and its associated tag. Comparison is then performed between the real address derived from the translation array and the real address derived from the tag array. Those skilled in the art can appreciate that the present invention disclosed herein, presents a different and much more creative scheme than the traditional process. Instead of making that comparison at the time the translation and the tag are read out, the comparison is made ahead of time for all possible tags and all possible storage translations and the result of that comparison is stored. Instead of performing the comparison according to the traditional method described herein, one need only index this comparison array in the same manner as indexing the segment register or TLB. For example, if a row is read out using the effective address bits that index the segment registers and then compared with the index that would have been utilized to index the TLB, the result of such a comparison is a "1" if the real address was previously matched. The result of such a comparison would be "0" if there is no match. Thus, the same information results from such an operation as in the prior art case.

The dimensions of the new table are established by the number of entries in the segment lookaside buffer or segment registers, and the number of entries in the TLB. The dimensions do not depend on the number of bits in the virtual address. Thus, the table is potentially smaller in practice and is independent of specific implementation so that in any subsequent generation of machine design, if the virtual address is made larger, it is unnecessary to change the design of this comparison array.

Such a precalculated comparison array does require maintenance, in that if an entry in either the segment lookaside buffer, segment register or the TLB is altered, a suitable change must be made in the value stored in the precalculated comparison array. If an entry is altered in the effective to virtual translation, the VSID for the new entry must be compared to all VSID's in the TLB. This comparison will produce a vector of 0's and 1's which must be written into an appropriate row or column of the precalculated comparison array.

Thus, in cache memory address translation, the effective address computed by a program is first converted to a virtual address using the mapping contained in the segment registers or segment lookaside buffer. The segment lookaside buffer forms a portion of the translation lookaside buffer. Within the segment lookaside buffer the virtual segment identifiers are stored. The virtual address is then converted to a real address using the mapping contained in the translation lookaside buffer. The translation described herein is utilized to determine the real page number portion of the real address. The low order 12 bits of the effective address are untranslated and specify the byte on the page. The translated real page number is compared to the tag stored in the directory or tag array to determine a cache hit or miss.

The invention described herein concerns the first step of the translation process (i.e., mapping the effective address to the virtual address). This part of the translation process is depicted in the 32-bit example of FIG. 3. Thus, the hardware 104 depicted in FIG. 2 is replaced in the configuration depicted in FIG. 3 via the newly added comparison array and associated circuitry. Those skilled in the art will appreciate that the invention described herein thus focuses on this comparison array and in particular, the effective to virtual conversion portion of the translation process.

FIG. 4 illustrates a flow diagram 160 that shows steps utilized to carry out the method and system of the present invention, in accordance with a preferred embodiment of the present invention. Flow diagram 160 is a general flow diagram, and those skilled in the art will appreciate that such a diagram can be modified and changed, according to a particular implementation of the present invention. Thus, as indicated at block 162, the process is initiated. As illustrated thereafter at block 164, a cache memory is designated within a data-processing system. As described next at block 166, cache lines are designated over which data may be transferred. Then, as indicated at block 168, a translation lookaside buffer of the type described herein is established. When the cache memory, cache lines, and translation lookaside buffer are established, the actual processing can begin. As illustrated at block 170, real addresses are associated with virtual addresses within the translation lookaside buffer. As subsequently depicted at block 172, virtual segment identifiers are stored within the translation lookaside buffer. Finally, as described at block 174, virtual segment identifiers are cross-referenced with effective addresses within a comparison array, such that the comparison array includes spaces populated with indications of whether or not a particular virtual segment identifier stored within the translation lookaside buffer corresponds to a particular effective address, thereby allowing a comparison to be performed in advance between effective addresses within the cache memory and all possible virtual segment identifiers maintained in the translation lookaside buffer, prior to any conversion of virtual addresses to real addresses. The process finally terminates, as indicated at 176.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A cache memory within a data-processing system, said cache memory having a plurality of cache lines over which data may be transferred, said cache memory comprising:
   a translation lookaside buffer for associating real addresses with virtual addresses, wherein virtual segment identifiers are stored within said lookaside buffer; and
   a comparison array for cross referencing virtual segment identifiers with effective addresses, said comparison array having spaces populated with indications of whether or not a particular virtual segment identifier stored within said translation lookaside buffer corresponds to a particular effective address, thereby allowing a comparison to be performed in advance between effective addresses within said cache memory and all possible virtual segment identifiers maintained in said translation lookaside buffer prior to any conversion of virtual addresses to real addresses.

2. The cache memory of claim 1 wherein each of said virtual segment identifiers comprise a portion of a virtual address.

3. The cache memory of claim 2 wherein said indications of whether or not a particular virtual segment identifier corresponds to a virtual segment identifier stored within said translation lookaside buffer, further comprises:
   indications of a cache hit or a cache miss.

4. The cache memory of claim 3 wherein said translation lookaside buffer further comprises a segment lookaside buffer.

5. The cache memory of claim 4 wherein said comparison array further comprises a comparison array which predetermines every possible tag located within said cache memory.

6. The cache memory of claim 5 wherein said comparison array further comprises:
   a tag array for storing a plurality of tags such that said tag array includes a tag array size equivalent to the number of tags stored within said tag array; and
   a table for storing all possible storage combinations of real addresses, wherein said table includes a table sized equivalent to the number of real addresses stored within said table.

7. The cache memory of claim 5 further comprising:
   a first decoder whose input is coupled to a first portion of an effective address and whose output is connected to an input of said comparison array;
   a multiplexer having a first input coupled to an output of said comparison array such that said multiplexer provides as output a virtual translation hit or miss;
   a second decoder whose input is coupled to a second portion of said effective address and whose output is coupled to an input of said translation lookaside buffer; and
   said second portion of said effective address connected to a second input of said multiplexer.

8. A method in a cache memory within a data-processing system for accessing data stored within said cache memory, wherein said cache memory includes a plurality of cache lines over which data may be transferred said method comprising:
   associating real addresses with virtual addresses within a translation lookaside buffer;
   storing virtual segment identifiers within said translation lookaside buffer; and
   cross referencing virtual segment identifiers with effective addresses within a comparison array, such that said comparison array includes spaces populated with indications of whether or not a particular virtual segment identifier stored within said translation lookaside buffer corresponds to a particular effective address, thereby allowing a comparison to be performed in advance between effective addresses within said cache memory and all possible virtual segment identifiers maintained in said translation lookaside buffer, prior to any conversion of virtual addresses to real addresses.

9. The method of claim 8 wherein the step of storing virtual segment identifiers within said translation lookaside buffer, further comprises the step of:
   storing virtual segment identifiers within said translation lookaside buffer, such that each of said virtual segment identifiers comprises a portion of a virtual address.

10. The method of claim 9 wherein the step of cross referencing virtual segment identifiers with effective addresses within a comparison array, such that said comparison array includes spaces populated with indications of whether or not a particular virtual segment identifier stored within said translation lookaside buffer corresponds to a particular effective address, thereby allowing a comparison to be performed in advance between effective addresses within said cache memory and all possible virtual segment identifiers maintained in said translation lookaside buffer, prior to any conversion of virtual addresses to real addresses, further comprises the step of:

cross referencing virtual segment identifiers with effective addresses within a comparison array, such that said comparison array includes spaces populated with indications of whether or not a particular virtual segment identifier stored within said translation lookaside buffer corresponds to a particular effective address, thereby allowing a comparison to be performed in advance between effective addresses within said cache memory and all possible virtual segment identifiers maintained in said translation lookaside buffer, prior to any conversion of virtual addresses to real addresses, such that said indications comprise indications of a cache hit or a cache miss.

11. The method of claim 10 wherein the step of associating real addresses with virtual addresses within a translation lookaside buffer, further comprises the step of:

associating real addresses with virtual addresses within a translation lookaside buffer, wherein said translation lookaside buffer comprises a segment lookaside buffer.

12. The method of claim 11 wherein the step of cross referencing virtual segment identifiers with effective addresses within a comparison array, such that said comparison array includes spaces populated with indications of whether or not a particular virtual segment identifier stored within said translation lookaside buffer corresponds to a particular effective address, thereby allowing a comparison to be performed in advance between effective addresses within said cache memory and all possible virtual segment identifiers maintained in said translation lookaside buffer, prior to any conversion of virtual addresses to real addresses, such that said indications comprise indications of a cache hit or a cache miss, further comprises the step of:

cross referencing virtual segment identifiers with effective addresses within said comparison array, wherein said comparison array further comprises a comparison array which predetermines every possible tag located within said cache memory.

13. The cache memory of claim 12 wherein the step of cross referencing virtual segment identifiers with effective addresses within a comparison array, such that said comparison array includes spaces populated with indications of whether or not a particular virtual segment identifier stored within said translation lookaside buffer corresponds to a particular effective address, thereby allowing a comparison to be performed in advance between effective addresses within said cache memory and all possible virtual segment identifiers maintained in said translation lookaside buffer, prior to any conversion of virtual addresses to real addresses, such that said indications comprise indications of a cache hit or a cache miss, further comprises the step of:

cross referencing virtual segment identifiers with effective addresses within said comparison array, such that said comparison array further comprises:

a tag array for storing a plurality of tags such that said tag array includes a tag array size equivalent to the number of tags stored within said tag array; and a table for storing all possible storage combinations of real addresses, wherein said table includes a table sized equivalent to the number of real addresses stored within said table.

14. The method of claim 13 further comprising the step of configuring said cache memory to further comprise:

a first decoder whose input is coupled to a first portion of an effective address and whose output is connected to an input of said comparison array;

a multiplexer having a first input coupled to an output of said comparison array such that said multiplexer provides as output a virtual translation hit or miss;

a second decoder whose input is coupled to a second portion of said effective address and whose output is coupled to an input of said translation lookaside buffer; and said second portion of said effective address connected to a second input of said multiplexer.

* * * * *